United States Patent
Kono et al.

(10) Patent No.: US 6,521,130 B1
(45) Date of Patent: Feb. 18, 2003

(54) PROCESS FOR PRODUCING COMPOSITE SEMIPERMEABLE MEMBRANE

(75) Inventors: Shunji Kono, Shiga (JP); Akihiko Ito, Shiga (JP); Yoshinari Fusaoka, Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/856,711

(22) PCT Filed: Sep. 28, 1999

(86) PCT No.: PCT/JP99/05300

§ 371 (c)(1),
(2), (4) Date: May 25, 2001

(87) PCT Pub. No.: WO01/23077

PCT Pub. Date: Apr. 5, 2001

(51) Int. Cl.[7] .............................................. B01D 61/00
(52) U.S. Cl. ................... 210/652; 210/500.28; 210/490; 210/321.6; 264/41; 427/244; 427/245
(58) Field of Search ....................... 210/500.38, 500.39, 210/500.37, 500.27, 321.6; 96/4, 10, 11; 95/45; 264/41; 427/244, 245

(56) References Cited

U.S. PATENT DOCUMENTS

| | | | | |
|---|---|---|---|---|
| 3,904,519 A | * | 9/1975 | McKinney et al. | |
| 4,229,291 A | * | 10/1980 | Walch et al. | |
| 4,277,344 A | * | 7/1981 | Cadotte | |
| 4,778,596 A | * | 10/1988 | Linder et al. | |
| 4,812,238 A | * | 3/1989 | Cadotte et al. | |
| 4,885,091 A | * | 12/1989 | Swedo et al. | |
| 4,888,116 A | * | 12/1989 | Cadotte et al. | |
| 4,960,517 A | * | 10/1990 | Cadotte | |
| 5,051,178 A | * | 9/1991 | Uemura et al. | |
| 5,258,203 A | * | 11/1993 | Arthur | |
| 5,582,725 A | * | 12/1996 | McGray et al. | |
| 5,922,203 A | * | 7/1999 | Tomaschke | |

FOREIGN PATENT DOCUMENTS

| | | | | |
|---|---|---|---|---|
| JP | 402126925 A | * | 5/1990 | |
| JP | 7-26023 | * | 1/1995 | |
| JP | 100033959 A | * | 2/1998 | |
| JP | 10-235173 A | * | 9/1998 | |
| JP | 11137982 A | * | 5/1999 | |

* cited by examiner

*Primary Examiner*—Ana Fortuna
(74) *Attorney, Agent, or Firm*—Morrison & Foerster LLP

(57) ABSTRACT

When forming a separating functional layer containing crosslinked polyamide, by carrying this out in the presence of 1) carboxylic acid ester with a total of 8 or more carbons, or 2) carboxylic acid, it is possible to provide a composite semipermeable membrane which, while still maintaining a high rejection rate, is more outstanding in its water permeability than hitherto.

15 Claims, No Drawings

PROCESS FOR PRODUCING COMPOSITE SEMIPERMEABLE MEMBRANE

TECHNICAL FIELD

The present invention relates to a composite semipermeable membrane which can be suitably employed in, for example, the desalination of seawater and brackish water, the production of ultra-pure water for use in semiconductor washing and the like, the purification of water supplies, the production of water for boilers, the re-utilization of waste water and sewage, the recovery of electrodeposition coating materials used as undercoats for motor vehicles and the like, the concentration of fruit juice and the production of wine; and a method for the production thereof; together with a water treatment method employing same.

TECHNICAL BACKGROUND

Aromatic polyamide semipermeable membranes are highly rigid due to the fact that they contain benzene rings, and they have the advantage that they can be readily produced by interfacial polycondensation between an aromatic polyfunctional amine and an aromatic polyfunctional acid chloride, so they are widely employed. As the aromatic polyfunctional amine there can be used, for example, m-phenylenediamine or triaminobenzene, and as the aromatic polyfunctional acid chloride there can be used, for example, the commercial monomer known as trimesoyl chloride, and membrane production is easy. In terms of the method of production, in general a polysulphone ultrafiltration membrane is formed on a polyester base material such as a nonwoven fabric, to produce a porous substrate, and this is coated with an aqueous solution of the polyfunctional amine such as m-phenylenediamine or triaminobenzene, after which coating is performed with a solution of for example trimesoyl chloride dissolved in a nonpolar solvent and, by a polycondensation reaction at the interface, there is formed a polyamide separating functional layer. A number of such aromatic polyamide semipermeable membranes have been reported hitherto (U.S. Pat. Nos. 3,744,642 and 3,926,798).

The aforesaid aromatic polyamide semipermeable membranes are characterized by outstanding pressure resistance and resistance to hydrolysis, but there are desired semipermeable membranes which can operate at still lower pressures than existing operating pressures and, furthermore, which have high water permeability.

Hence, in order to enhance the water permeability of the membrane, a number of methods have been investigated whereby additives such as polar solvents are added either to the amine solution or to the acid chloride solution, or to both, in the formation of the polyamide separating functional layer by interfacial polycondensation. For example, there are methods in which an ether such as diethyl ether, methyl t-butyl ether, tetrahydrofuran or dioxane, a ketone such as acetone, methyl isobutyl ketone or 2-butanone, or an ester such as methyl acetate, ethyl formate or ethyl acetate, is added to the acid chloride solution.

However, there has been the problem that, in the production of for example ultra-pure water for semiconductor washing in the semiconductor industry, as well as having higher water permeability a semipermeable membrane with an enhanced rejection capacity in terms of organic materials and the like is demanded, but the aforesaid methods are inadequate for this.

Against the background of the conventional problems described above, the objectives of the present invention lie in offering a method for the production of a composite semipermeable membrane which, while maintaining a high rejection rate, is also outstanding in its water permeability compared to hitherto; and the composite semipermeable membrane produced by this method.

DISCLOSURE OF THE INVENTION

In order to meet the aforesaid objectives, the present invention relates to a method of producing a composite semipermeable membrane which is characterized in that a separating functional layer containing crosslinked polyamide is formed in the presence of 1) carboxylic acid ester with a total of 8 or more carbons, or 2) carboxylic acid; to the composite semipermeable membrane produced in this way; and to a water treatment method employing same.

Optimum Form for Practising the Invention

The carboxylic acid ester with a total of 8 or more carbons is not particularly restricted in the structure of its main chain and ester region, and it may have any chemical structure such as linear, branched, cyclic, saturated or unsaturated. If the total number of carbons in the carboxylic acid ester is less than 8, there is a tendency for the separating functional layer water permeability enhancement effect to be reduced, while if the total number of carbons exceeds 20 then the boiling point is high, it is difficult to eliminate the ester from the composite semipermeable membrane and it becomes difficult to manifest high water permeability. Hence, the total number of carbons is preferably in the range 8 to 20, and more preferably 8 to 12. As examples of carboxylic acid esters where the main chain and ester moieties comprise straight chain alkyl groups, there are ethyl caproate, ethyl heptanoate, methyl caprylate, ethyl caprylate, methyl pelargonate, ethyl pelargonate, ethyl nonanoate, methyl decanoate, ethyl decanoate, methyl undecanoate, ethyl undecanoate, methyl dodecanoate, ethyl dodecanoate, methyl tridecanoate, ethyl tridecanoate and the like; as examples of cyclic unsaturated carboxylic acid esters, there are methyl benzoate, phenyl benzoate, phenyl acetate and the like; as examples of cyclic saturated carboxylic acid esters there are methyl cyclohexanecarboxylate, cyclohexyl acetate and the like; and as examples of branched saturated alkyl carboxylic acid esters, there are isoamyl caprylate, isobutyl isobutyrate, isobutyl isopentanoate, isopropyl t-butylacetate, ethyl 2-ethylheptanoate, methyl 3-methylnonanoate and the like. Furthermore, as examples of unsaturated alkyl carboxylic acid esters, there can be employed hexyl methacrylate, ethyl trans-3-hexenoate, ethyl cis-2-octenaote, ethyl trans-4-nonenoate and the like. In order to bring about the presence of such a carboxylic acid ester, the ester may be added to the polyfunctional amine solution or to the polyfunctional acid chloride solution, or it can be used to impregnate the porous substrate. In the case where it is added to the polyfunctional amine solution or to the polyfunctional acid chloride solution, the concentration is not particularly restricted but, if too much is added, it can be difficult to remove from the composite semipermeable membrane formed, while if too little is added it is difficult to show any effect. Hence, from 0.01 wt % to 50 wt % is preferred, with 0.1% to 10% being further preferred.

In the present invention, it is desirable that an acylation catalyst be jointly present along with the aforesaid carboxylic acid ester. An acylation catalyst refers to a catalyst which promotes hydrolysis reaction and increases the amount of carboxyl groups produced. Examples thereof are nitrogen-containing organic compounds such as pyridine, dimethyl formamide, N-methylpyrrolidone, 2-pyrrolidone, 2-piperidone, N,N-dimethylformamide, N,N- diethylformamide, N,N'-dimethylpropyleneurea, 1,1'-carbonyldipyrrolidine and hexamethylphosphoramide. Of these, compounds with the following structures have a higher effect in terms of enhancing the membrane properties and so are preferred.

(1) N-alkylamides or N,N-dialkylamides having an alkyl group with at least 3 carbons as a substituent group on the nitrogen atom.
(2) Cyclic alkylamides or N-alkyl cyclic alkylamides having a cyclic structure with 5 or more carbons.
(3) N,N,N',N'-tetraalkylureas having alkyl groups as substituents on the nitrogen atoms.
(4) Alkylene ureas having a cyclic structure containing an alkylene chain with 3 or more carbons.

As compounds which fall into category (1), there can be used for example N-cyclohexylformamide, N,N-diisopropylformamide, N,N-diisopropylacetamide and N,N-dibutylformamide Furthermore, as compounds which fall into category (2), there can be used δ-valerolactam, N-methyl-δ-valerolactam, ε-caprolactam, N-methyl-ε-caprolactam, 2-azacyclooctanone and 2-azacyclononanone. As examples of compounds which fall into category (3), there can be used 1,1,3,3-tetramethylurea and 1,1,3,3-tetraethylurea. Again, as examples of compounds which fall into the category (4), there can be used N,N'-dimethylpropyleneurea, bis(tetramethylene)urea and bis(pentamethylene)urea. By jointly employing the aforesaid carboxylic acid ester and acylation catalyst, the solute separation properties and water permeability of the composite semipermeable membrane obtained are further enhanced. Moreover, this effect is further increased by jointly employing two or more types of acylation catalyst. As a method for bringing about the presence of acylation catalyst when forming the separating functional layer, the acylation catalyst may be added to the polyfunctional amine solution or the polyfunctional acylation catalyst solution, or it can be used to impregnate the porous substrate. In the case where it is added to the polyfunctional amine solution or the polyfunctional acid chloride solution, the preferred amount added will differ according to the particular solution to which it is added. When added to the amine solution, the amount added is preferably 0.01 to 20 wt %, with 0.1 to 10 wt % still further preferred. When added to the acid chloride solution, the amount added is preferably 0.01 to 10 wt %, with 0.01 to 5 wt % being still further preferred. The reason why, when added to the acid chloride solution, the preferred range is lower than in the case when added to the amine solution, is thought to be because it acts more effectively when acid chloride is present in the same solution. Now, if there is too much acid chloride, the solute eliminating performance obtained may be reduced, while if there is too little then it is difficult to show an effect.

The carboxylic acid used in the present invention may have any chemical structure such as linear, branched, cyclic, saturated or unsaturated. For example, it may be an aliphatic carboxylic acid or an aromatic carboxylic acid. An aliphatic carboxylic acid is a compound comprising an aliphatic hydrocarbon group of linear, branched or cyclic molecular structure, and this hydrocarbon group may be saturated or unsaturated. Examples of linear saturated aliphatic carboxylic acids are formic acid, acetic acid, propionic acid, butyric acid, caproic acid, heptanoic acid, caprylic acid, pelargonic acid, nonanoic acid, decanoic acid, undecanoic acid, dodecanoic acid and tridecanoic acid. Furthermore, examples of branched saturated aliphatic carboxylic acids are isobutyric acid, isopentanoic acid, 2-ethylheptanoic acid and 3-methylnonanoic acid. Again, as examples of unsaturated aliphatic carboxylic acids there are methacrylic acid, trans-3-hexenoic acid, cis-2-octenoic acid and trans-4-nonenoic acid, while an example of a cyclic saturated aliphatic carboxylic acid is cyclohexanecarboxylic acid. An aromatic carboxylic acid is a compound in which an aromatic ring is directly connected to the carboxylic acid group. Examples of aromatic carboxylic acids are benzoic acid, isophthalic acid, terephthalic acid, 2-naphthalenecarboxylic acid, 4-naphthalenecarboxylic acid and 2,4-naphthalenedicarboxylic acid. These carboxylic acids may be present on their own, or they may be mixed with other compounds.

The boiling point of the carboxylic acid at normal pressure is preferably no more than 240° C. If the boiling point exceeds 240° C, then there. will be insufficient vaporization of the carboxylic acid in the membrane production process, and carboxylic acid will remain on the membrane, so that high water permeability is not manifested or the solute rejection performance is lowered.

With regard to the carboxylic acid concentration, it is preferred that the optimum concentration be determined according to the particular carboxylic acid added. If the carboxylic acid concentration is too low, or too high, there is a tendency for the water permeability to be lowered. In the case where the carboxylic acid is added to the polyfunctional acid chloride solution, the amount of the aforesaid carboxylic acid is preferably in the range from 0.03 to 30 wt %, and more preferably 0.1 to 10 wt %. In the case where added to the amine solution, the amount is preferably in the range 0.1% to 30 wt %. The range 0.5 to 500 equivalents in terms of the polyfunctional acid halide is preferred, with the range 1.5 to 150 equivalents further preferred.

When forming the separating functional layer containing crosslinked polyamide, there may also be present other compounds than the compounds described above. As said other compounds, compounds with polar functional groups within the structure are preferred, examples of which are compounds with an ester group, keto group, ether group, sulphone group, ammonium group, amino group, imino group, hydroxyl group, carboxyl group, formyl group, sulpho group, thio group, mercapto group, sulphinyl group, sulphonyl group, sulphino group or the like. In the case where added to the polyfunctional acid chloride solution, if there is employed a compound having the same or similar number of carbons as the organic solvent used, then elimination from the composite semipermeable membrane obtained is facilitated, so this is preferred. If the amount of such compound added is too great, then not only is the elimination thereof difficult but also a lowering in the solute rejection performance of the composite semipermeable membrane obtained may arise. Conversely, if the amount is too small, then it is difficult for the membrane performance-enhancing effect to be manifested. Hence, 0.01% to 50 wt % is preferred, with 0.01 to 10 wt % further preferred.

Examples of the aforesaid polyfunctional amine are aromatic polyfunctional amines such as phenylenediamines in which the two amino groups connected to the benzene have an ortho-, meta- or para-positional relationship, 1,3,5-triaminobenzene, 1,2,4-triaminobenzene, 3,5-diaminobenzoic acid, xylylene diamine, 2,4-diaminotoluene, 2,4-diaminoanisole and amidol, aliphatic amines such as ethylenediamine, propylenediamine and tris(2-aminoethyl)amine, and alicyclic polyfunctional amines such as 1,2-diaminocyclohexane, 1,4-diaminocyclohexane, 1,3-diaminocyclohexane, piperazine, 4-aminomethylpiperazine and 2,5-dimethylpiperazine. Of these, from the point of view of ready availability and ease of handling, and from the point of view of the properties of the composite semipermeable membrane obtained, the use of m-phenylenediamine (hereinafter referred to as m-PDA), p-phenylenediamine, 1,3,5-triaminobenzene, ethylenediamine and piperazine is preferred. These amines can be used on their own, or they may be used as mixtures.

The composite semipermeable membrane containing the aforesaid crosslinked polyamide can be formed by interfacial polycondensation. The interfacial polycondensation can be carried out by effecting contact between a solution of polyfunctional amine and a solution of polyfunctional acid chloride. More specifically, after bringing the solution containing the aforesaid polyfunctional amine into contact with the porous substrate, the excess solution is eliminated, and then contact is brought about with a solution containing the aforesaid polyfunctional acid chloride, in which the solvent used is immiscible with the solvent in the amine solution.

Examples of the aforesaid polyfunctional amine are aromatic polyfunctional amines such as phenylenediamines in which the two amino groups connected to the benzene have an ortho-, meta- or para-positional relationship, 1,3,5-triaminobenzene, 1,2,4-triaminobenzene, 3,5-diaminobenzoic acid, xylylene diamine, 2,4-diaminotoluene, 2,4-diaminotoluene, 2,4-diaminoanisole and amidol, aliphatic amines such as ethylenediamine, propylenediamine and tris(2-aminoethyl)amine, and alicyclic polyfunctional amines such as 1,2-diaminocyclohexane, 1,4-diaminocyclohexane, 1,3-diaminocyclohexane, piperazine, 4-aminomethylpiperazine and 2,5-dimethylpiperazine. Of these, from the point of view of ready availability and ease of handling, and from the point of view of the properties of the composite semipermeable membrane obtained, the use of m-phenylenediamine (hereinafter referred to as m-PDA), p-phenylenediamine, 1,3,5-triaminobenzene, ethylenediamine and piperazine is preferred. These amines can be used on their own, or they may be used as mixtures.

The solvent in the polyfunctional amine solution is not particularly restricted and should be decided taking into account the solubility of the polyfunctional amine, the miscibility with the acid chloride or solution thereof, and toxicity, flammability and cost. From such points of view, the use of water is preferred.

In the case where the aforesaid polyfunctional amine is used in the form of an aqueous solution, the concentration thereof is preferably in the range 0.1 to 20 wt %, and more preferably in the range 0.5 to 10 wt %. By having the polyfunctional amine concentration within the aforesaid range, as well as it being possible to carry out the interfacial polycondensation reaction efficiently, it is also possible to control the membrane properties of the separating functional layer formed.

Again, it is also possible to add various kinds of other additives to the polyfunctional amine solution. Examples thereof are the aforesaid carboxylic acid esters, acylation catalysts, carboxylic acids and other polar group-containing compounds.

Moreover, it is also possible to add surfactants as additives. Surfactants have the effect of enhancing the wetting of the porous substrate surface and lowering the interfacial tension between the aqueous amine solution and the nonpolar solvent. Examples of such surfactants are sodium dodecyl sulphate (referred to below as DSS) and sodium dodecylbenzenesulphonate. The amount added is not particularly restricted but, if it is too great, then the interfacial tension is lowered too far and it may be difficult to control the thickness of the separating functional layer. If is too low, then it is difficult to show any effect. Hence, 0.01 to 10 wt % is preferred, with 0.1 to 5% being further preferred.

It is also possible to add a phase transfer catalyst as an additive. A phase transfer catalyst has the effect of promoting the reaction between the aqueous phase and the organic phase. Examples of phase transfer catalysts which can be employed are quaternary ammonium salts typified by n-heptyltriethylammonium chloride, trioctylmethylammonium chloride and benzyltriethylammonium chloride (the Makosza catalyst), and phosphonium salts typified by hexadecyltributylphosphonium chloride. If such a catalyst is added in excess, it may lead to a lowering of the solute rejection performance, so 0.01% to 10% is preferred, with 0.01% to 5% being further preferred.

The compounds which can be added to the aforesaid amine solution can all also be added to the organic solvent solution containing the acid chloride which is described below.

In order to form the separating functional layer containing crosslinked polyamide, the interfacial polycondensation can be carried out on the porous substrate. For this purpose, first of all the aforesaid aqueous amine solution is brought into contact with the porous substrate. This contacting is preferably carried out uniformly and continuously on the porous substrate. Specifically, there can be employed the method of coating the porous substrate with the aqueous amine solution and the method of immersing the porous substrate in the aqueous amine solution. If the contact time between the porous substrate and the aqueous amine solution is too long, then the production efficiency is lowered, while if it is too short it is difficult to obtain stable membrane performance. Hence, a time in the range 10 seconds to 10 minutes is preferred, with from 1 to 3 minutes further preferred.

The porous substrate is not particularly restricted but it should have the pressure resistance to withstand the operating pressure in seawater desalination and the like, and a film is preferred which essentially does not have reverse osmosis properties. Again, it is preferred that it be a substrate with a structure having uniform fine pores or having asymmetrical porosity with the pores gradually becoming larger from one face in the direction of the other, and with the size of the pores opening out at the surface being on average no more than 100 nm. The aforesaid porous substrate can for example be selected from commercial materials such as "Millipore Filter VSWP" made by the Millipore Corp. and "Ultrafilter UK10" made by Toyo Roshi K.K., or it can be produced in accordance with the methods described in the "Office of Saline Water Research and Development Progress Report" No. 359 (1968).

As materials, there can be used, for example, homopolymers such as polysulphones, polyethersulphones, polyphenylenesulphide sulphones, polyphenylenesulphones, polyimides and polyvinylidene fluoride, or blends thereof, but the use of the chemically, mechanically and thermally stable polysulphones and polyethersulphones is preferred.

As an example of the method of producing the porous substrate, a dimethylformamide (DMF) solution of a polysulphone is coated at a fixed thickness onto a densely constructed polyester woven or nonwoven fabric as a base material, after which wet coagulation is carried out in an aqueous solution containing 0.5 wt % sodium dodecylsulphate and 2 wt % of DMF, so that there is obtained a porous substrate with the greater part of its surface covered with fine pores of diameter no more than a few tens of nm.

The thickness of the aforesaid porous substrate and of the base material will affect the strength of the composite semipermeable membrane and the packing density when an element is produced. If too thin, then the mechanical strength will be insufficient and if too thick then the packing density when produced as an element is lowered. Hence, the base material thickness is preferably within the range 50 to 300 µm, and more preferably within the range 75 to 200 µm. Furthermore, the thickness of the porous substrate is preferably in the range 10 to 200 µm and more preferably in the range 30 to 100 µm.

The porous substrate film formation can be observed by means of a scanning electron microscope, a transmission electron microscope or an atomic force microscope. For example, where observation is carried out with a scanning electron microscope, the porous substrate is peeled away from the base material, after which it is sectioned by a freeze-sectioning method, to produce the sample for observation of the cross-section. This sample is thinly coated with platinum, platinum-palladium or ruthenium tetroxide, preferably with ruthenium tetroxide, and observation carried out with a high resolution field emission type scanning electron microscope (UHR-FE-SEM) at an acceleration voltage of 3 to 6 kV. For the high resolution field emission type scanning electron microscope, there can be used for example a model S-900 type electron microscope made by Hitachi Ltd. The film thickness of the porous substrate and the diameter of the surface pores is determined from the electron micrograph obtained. Now, the thickness and pore diameter referred to in the present invention are average values.

After bringing the aqueous amine solution into contact with the porous substrate, the liquid is fully drained off so that no liquid droplets remain on the film. If liquid droplets remain, the locations where said liquid droplets remain following membrane formation constitute membrane defects and a reduction in the membrane performance tends to arise. With regard to the method used for draining off the liquid, there can be used for example the method of holding the porous substrate in a vertical direction following contact with the aqueous amine solution and allowing the excess aqueous solution to flow down naturally, and/or the method of applying a flow of nitrogen or the like from a gas nozzle and forcibly driving-off the liquid.

Next, following contact with the amine solution, a solution containing the polyfunctional acid chloride is brought into contact with the supporting film obtained as described above.

As examples of the polyfunctional acid chloride there are, in the case of trifunctional acid chlorides, trimesoyl chloride, 1,3,5-cyclohexanetricarboxylic acid trichloride and 1,2,4-cyclobutanetricarboxylic acid trichloride; and, in the case of difunctional acid chlorides, aromatic difunctional acid chlorides like biphenyldicarboxylic acid dichloride, biphenylene dicarboxylic acid dichloride, azobenzene dicarboxylic acid dichloride, terephthaloyl chloride, isophthaloyl chloride and naphthalenedicarboxylic acid chloride, aliphatic difunctional acid chlorides like adipoyl chloride and sebacoyl chloride, and alicyclic difunctional acid chlorides like cyclopentane dicarboxylic acid dichloride, cyclohexane dicarboxylic acid dichloride and tetrahydrofuran dicarboxylic acid dichloride. Of these, from the point of view of ready availability and ease of handling, and from the point of view of the performance of, the composite semipermeable membrane obtained, trimesoyl chloride, trimesoyl chloride and terephthaloyl chloride are preferred. These acid chlorides can be used on the own or they can be used as mixtures.

When carrying out the interfacial polycondensation, as the solvent for the solution containing the acid chloride there is preferably used a solvent which is immiscible with the solvent in the amine solution and, furthermore, which dissolves the polyfunctional acid chloride. Again, it is preferred that it does not react at an effective rate with the polyfunctional acid chloride and that it does not harm the porous substrate by dissolution or the like. Moreover, the solvent used should be of a kind such that a thin film can be formed in the interfacial polycondensation reaction. For example, there can be used hydrocarbons such as pentane, hexane and heptane, or trichlorotrifluoroethane. Amongst these, taking into account protection of the ozone layer, ready availability and ease of handling, the use of the hydrocarbons is preferred. Amongst the hydrocarbons, those that are not volatile at room temperature and normal pressure are preferred, and so hydrocarbons with at least 6 carbons are preferred. It is further preferred that they be hydrocarbons with at least 8 carbons. Moreover, it is preferred that there be used a hydrocarbon of flash point at least 10° C., and if the flash point is the range 10 to 300° C., this is still further preferred. If the flash point is below 10° C. then handling becomes difficult, while if the flash point exceeds 300° C. then the viscosity becomes marked and, again, handling becomes difficult. Specifically, there can be used for example linear hydrocarbons such as n-octane, n-nonane, n-decane, n-undecane, n-dodecane and n-tridecane, and branched hydrocarbons such as isooctane.

The concentration of the polyfunctional acid chloride in the aforesaid organic solvent solution is preferably in the range 0.01 to 5 wt %, and it is further preferred that it be within the range 0.02 to 2.0 wt %. When the concentration of the polyfunctional acid chloride lies within the aforesaid range, it is possible to control the interfacial polycondensation reaction with the polyfunctional amine and the properties of the membrane.

The contacting of the porous substrate film with the aforesaid organic solvent solution containing polyfunctional acid chloride can be carried out by coating or immersion, in the same way as the case of the polyfunctional aqueous amine solution. The contacting time should be sufficient such that an interfacial polycondensation reaction takes place between the polyfunctional amine and the polyfunctional acid chloride, to form the separating functional layer containing crosslinked polyamide on the porous substrate. However, if the time of contacting is too long, then the production efficiency is lowered, while if it is too short then it is difficult to achieve the stable membrane propeties. Hence, the time is preferably within the range 10 seconds to 10 minutes, and more preferably within the range 20 seconds to 5 minutes.

After carrying out the interfacial polycondensation by effecting contact with the acid chloride solution as described above, and forming a separating functional layer containing crosslinked polyamide on the porous substrate, the excess solvent should be drained off. With regard to the method used for draining off the liquid, there can be employed for example the method of holding the membrane in a vertical direction and allowing the excess organic solvent solution to flow off naturally, and/or the method of applying a flow of nitrogen or the like from a gas nozzle and forcibly driving-off the liquid. In such circumstances, the treatment time by the aforesaid method is preferably within the range 10 seconds to 5 minutes, and more preferably within the range 1 to 3 minutes.

When the draining off of the liquid is finished, it is preferred that drying of the membrane surface be carried out. The drying method can be by natural drying but the drying can also be carried out by blowing gas at the membrane face at a rate of 2 to 20 m/sec and more preferably in the range 3 to 10 m/sec, at a temperature in the range 10 to 80° C. and more preferably in the range 20 to 40° C. If the rate is less than 2 m/sec, or if the temperature is less than 10° C., the drying may be incomplete, while if rate exceeds 20 m/sec or the temperature exceeds 80° C., there is a tendency for shrinkage of the porous substrate to occur due to excessive vaporization of the solvent, and a membrane of low water permeability may be produced.

The composite semipermeable membrane obtained in this way will, as it is, show sufficiently good separation performance but it is possible to further enhance the composite semipermeable membrane rejection properties and the water permeability by the addition of, for example, a process in which the residual acid chloride is hydrolysed by contact with an aqueous solution of alkali such as sodium carbonate, a heat-treatment process in the range 50 to 150° C. and preferably 50 to 130° C., for 10 seconds to 10 minutes and preferably 30 seconds to 8 minutes, or a process of immersion in an oxidizing solution such as an aqueous solution containing chlorine.

Above, there has been explained the example of the formation of the separating functional layer employing monomers, in particular a composite semipermeable membrane having a separating functional layer where the material is polyamide, but the present invention is not restricted to these. The formation of the separating functional layer can also be carried out by application of polymer containing polyamide, and the applied polymer can also be subjected to subsequent crosslinking. From the point of view of enhancing the chemical resistance, enhancing durability such as the abrasion resistance, and enhancing the rejection rate, the carrying out of subsequent crosslinking is preferred.

Again, it is also possible to further provide a coating layer on top of the separating functional layer provided on the porous substrate, or to modify the surface of the separating functional layer. A coating layer not only protects the separating functional layer but also makes it possible. to control the surface charge and to control the solute rejection performance and the water permeability of the composite semipermeable membrane. The material of the coating layer is not particularly restricted and may be suitably selected according to the application, but an example is polyvinyl alcohol. By surface modification of the separating functional layer, control of the functional groups at the surface of the composite semipermeable membrane layer is possible, together with the amount thereof, and control of the water permeability and solute rejection is possible. For said surface modification there can be used a method such as the aforesaid coating method, but general methods include changing the chemical structure of the surface by chemical treatment, plasma treatment, UV treatment and the like.

The form of the composite semipermeable membrane in the present invention is not particularly restricted providing it has a separating functional layer, and examples include flat membranes and hollow fibres, etc. Again, when enhanced mechanical strength is required, the separating functional layer may also be employed, together with the porous substrate, a base material, examples of which are fabrics, nonwoven fabrics, paper and the like, as described above.

The composite semipermeable membrane obtained in the present invention can be given a spiral form together with a channelling material or the like, or hollow fibres can be bunched together, to produce an element, and this can be inserted in a pressure-resistant container and used incorporated into a module. By producing an element or module form in this way, the packing density of the membrane is raised, and it is possible to fully realize the solute separation performance and water permeability of the composite semipermeable membrane, so this is preferred. Now the aforesaid element and module forms are just examples, and there is no restriction thereto.

The aforesaid module is used as equipment in conjunction with a pressure pump and other parts, and it is also possible to produce plant in combination with pre-treatment and post-treatment equipment. The optimal pre-treatment equipment and post-treatment equipment should be appropriately selected according to the particular application and the treated liquid. For example, these may comprise sand filtration equipment, ion-exchange resins, a mixed-bed tower, UV equipment, a cartridge polisher, an ultrafiltration device, various types of chemical treatment equipment and other such normal water treatment equipment. In an ultra-pure water production plant, the treatment of the source water in the primary pure water system may comprise in turn sand filtration, an aforesaid module, ion-exchange resins, a mixed-bed tower and an aforesaid module again, or there may be further incorporated an aforesaid module instead of the ion-exchange resin or mixed-bed tower. Again, it is also possible to use the aforesaid module in the recovery of ultra-pure water following use thereof. In such circumstances, since the composite semipermeable membrane is readily contaminated by the treatment liquid, it is preferred that there be used a composite semipermeable membrane which has undergone surface modification. As described above, some examples of equipment and plant have been given but the present invention is not restricted to these.

The operating pressure when the composite semipermeable membrane of the present invention is used by incorporation into a module is not particularly restricted but, if it is too high, the membrane is distorted and there is the possibility that the characteristics will be altered. Furthermore, if it is too low, there is the possibility that the selective separating performance will be lowered. Hence, 0.1 to 10 MPa is preferred and 0.1 to 3.0 MPa is more preferred.

Again, the subject of the selective separation is not particularly restricted and examples include aqueous solutions and solutions containing organic substances. However, of these, the effects are highest in terms of aqueous solution and, in particular, the present invention can be employed in the desalination of concentrated brackish water and seawater, in the production and recovery of ultra-pure water, and in the treatment of waste water.

EXAMPLES

In the examples and comparative examples below, a polyester nonwoven fabric was used as the base material. Furthermore, as the porous substrate, there was used a polysulphone film of thickness 50 $\mu$m formed using polysulphone polymer of molecular weight in the range 22,000 to 35,000. In this film, fine pores of average pore size in the range 10 to 30 nm were provided.

Furthermore, the properties of the composite semipermeable membranes obtained were evaluated by measuring the sodium chloride rejection rate (percentage desalting) and the water flux by conducting permeation using an aqueous solution of temperature 25° C., pH 6.5 and sodium chloride concentration 1,500 ppm for 3 hours at an operating pressure of 0.74 MPa.

Moreover, as a measure of the organic material rejection performance, the isopropyl alcohol (hereinafter referred to as IPA) rejection rate (percentage IPA rejection) was measured. Determination was made by measurement following 2 hours permeation of an aqueous solution of IPA concentration 1,000 ppm under an operating pressure of 0.74 MPa, at a temperature of 25° C. and pH of 6.5.

The sodium chloride concentration was determined by normal conductivity measurement and the isopropyl alcohol concentration was determined by normal gas chromatography measurement.

Here, the rejection rate is the value expressed by the following relationship.

rejection rate (%)=(solute concentration in the supplied water−solute concentration in the water permeate)×100/(solute concentration in the supplied water)

water flux $(m^3.m^{-2}.d^{-1})$=(amount of liquid permeate per day)/(membrane area)

Example 1

A polysulphone film was immersed for 2 minutes in a polyfunctional amine aqueous solution containing 1.5 wt % m-phenylenediamine (below abbreviated to m-PDA), after which the face of the membrane was held vertically and liquid allowed to run off until no droplets remained. The polysulphone film coated with m-PDA which was obtained in this way was then brought into contact for 1 minute with an. n-decane solution of polyfunctional acid chloride which contained 0.06 wt % of trimesoyl chloride (below referred to as TMC)and 3 wt % of caprylic acid ethyl ester (referred to below as CAEE). Thereafter, the liquid was allowed to drain off for 1 minute, and then drying performed using a blower by blowing gas at 20° C. such that the gas velocity at the film surface was 5 m/sec. Next, this coated film was immersed for 2 minutes in an aqueous solution containing 1 wt % $Na_2CO_3$ and 0.3 wt % sodium dodecylsulphonate (referred to below as DSS).

The semipermeable membrane obtained in this way was washed with hot water for 2 minutes at 90° C., after which it was immersed for 2 minutes in an aqueous solution of sodium hypochlorite of chlorine concentration 500 ppm and pH 7, and then kept immersed in a 0.1 wt % aqueous solution of sodium hydrogen sulphite.

When the properties of the composite semipermeable membrane obtained were measured, the salt rejection rate was 99.6%, the water flux was 1.02 $(m^3.m^{-2}.d^{-1})$ and the IPA rejection rate was 93.4%.

Example 2

A composite semipermeable membrane was obtained in the same way as in Example 1 except that there was further added 0.15 wt % of N,N-dibutylformamide (hereinafter referred to as DBF) to the polyfunctional acid chloride solution. The evaluation results are shown in Table 1.

Example 3

A composite semipermeable membrane was obtained in the same way as in Example 1 except that the concentration of the m-PDA was 1.0 wt % and there was further added 0.15 wt % of bis(pentamethylene)urea (hereinafter referred to as BPMU) to the polyfunctional acid chloride solution. The evaluation results are shown in Table 1.

Example 4

A composite semipermeable membrane was obtained in the same way as in Example 1 except that there was added 1.5 wt % of N-methylpyrrolidone (hereinafter referred to as NMP) to the polyfunctional amine solution. The evaluation results are shown in Table 1.

Example 5

A composite semipermeable membrane was obtained in the same way as in Example 4 except that the concentration of the CAEE was made 5 wt %. The evaluation results are shown in Table 1.

Example 6

A composite semipermeable membrane was obtained in the same way as in Example 4 except that there was further added 0.15 wt % of BMPU to the polyfunctional acid chloride solution. The evaluation results are shown in Table 1.

Example 7

A composite semipermeable membrane was obtained in the same way as in Example 4 except that the NMP was changed to $\epsilon$-caprolactam (referred to below as $\epsilon$-CL). The evaluation results are shown in Table 1.

Example 8

A composite semipermeable membrane was obtained in the same way as in Example 7 except that the concentration of the CAEE was made 5 wt %. The evaluation results are shown in Table 1.

Example 9

A composite semipermeable membrane was obtained in the same way as in Example 7 except that the concentration of CAEE was made 50 wt %. The evaluation results are shown in Table 1.

Example 10

A composite semipermeable membrane was obtained in the same way as in Example 7 except that there was further added 0.15 wt % of BPMU to the polyfunctional acid chloride solution. The evaluation results are shown in Table 1.

TABLE 1

| | Polyfunctional Amine Solution | | Polyfunctional Acid Chloride Solution | | | | | | Desalting Rate | Water Flux | IPA Rejection Rate |
| | m-PDA | Acylation Catalyst | | TMC | Carboxylic Acid or Carboxylic Acid Ester | | | Acylation Catalyst | | | | |
| | wt % | type | wt % | wt % | type | wt % | total carbons | type | wt % | % | $m^3m^{-2}d^{-1}$ | % |
|---|---|---|---|---|---|---|---|---|---|---|---|---|
| Example 1 | 1.5 | — | — | 0.06 | CAEE | 3 | 10 | — | — | 99.6 | 1.02 | 93.4 |
| Example 2 | 1.5 | — | — | 0.06 | CAEE | 3 | 10 | DBF | 0.15 | 99.5 | 1.24 | 91.8 |
| Example 3 | 1.0 | — | — | 0.06 | CAEE | 3 | 10 | BPMU | 0.15 | 99.7 | 1.20 | 90.8 |

TABLE 1-continued

| | Polyfunctional Amine Solution | | Polyfunctional Acid Chloride Solution | | | | | | Desalting Rate | Water Flux | IPA Rejection |
| | | | | Carboxylic Acid or | | | | | | | |
| | m-PDA | Acylation Catalyst | TMC | Carboxylic Acid Ester | | | Acylation Catalyst | | | | |
| | wt % | type | wt % | wt % | type | wt % | total carbons | type | wt % | % | m³m⁻²d⁻¹ | Rate % |
|---|---|---|---|---|---|---|---|---|---|---|---|---|
| Example 4 | 1.5 | NMP | 1.5 | 0.06 | CAEE | 3 | 10 | — | — | 99.5 | 1.22 | 93.0 |
| Example 5 | 1.5 | NMP | 1.5 | 0.06 | CAEE | 5 | 10 | — | — | 99.6 | 1.14 | 93.8 |
| Example 6 | 1.5 | NMP | 1.5 | 0.06 | CAEE | 3 | 10 | BPMU | 0.15 | 99.6 | 1.28 | 92.3 |
| Example 7 | 1.5 | ϵ-CL | 1.5 | 0.06 | CAEE | 3 | 10 | — | — | 99.3 | 1.17 | 93.7 |
| Example 8 | 1.5 | ϵ-CL | 1.5 | 0.06 | CAEE | 5 | 10 | — | — | 99.3 | 1.28 | 94.6 |
| Example 9 | 1.5 | ϵ-CL | 1.5 | 0.06 | CAEE | 50 | 10 | — | — | 99.2 | 0.97 | 92.7 |
| Example 10 | 1.5 | ϵ-CL | 1.5 | 0.06 | CAEE | 3 | 10 | BPMU | 0.15 | 99.6 | 1.24 | 90.0 |

Example 11

A composite semipermeable membrane was obtained in the same way as in Example 10 except that the concentration of the m-PDA was made 1.0 wt %. The evaluation results are shown in Table 2.

Example 12

A composite semipermeable membrane was obtained in the same way as in Example 10 except that the concentration of the TMC was made 0.08 wt %. The evaluation results are shown in Table 2.

Example 13

A composite semipermeable membrane was obtained in the same way as in Example 7 except that there was further added 0.15 wt % of DBF to the polyfunctional acid chloride solution and the TMC concentration was made 0.1 wt %. The evaluation results are shown in Table 2.

Example 14

A composite semipermeable membrane was obtained in the same way as in Example 11 except that instead of the BPMU there was used tetraethylurea (referred to below as TEU) Thet evaluation results are shown in Table 2.

Example 15

A composite semipermeable membrane was obtained in the same way as in Example 7 except that instead of the CAEE there was used methacrylic acid hexyl ester (referred to below as MAHE). The evaluation results are shown in Table 2.

Example 16

A composite semipermeable membrane was obtained in the same way as in Example 7 except that instead of the CAEE there was used pelargonic acid methyl ester (referred to below as PAME). The evaluation results are shown in Table 2.

Example 17

A composite semipermeable membrane was obtained in the same way as in Example 7 except that instead of the CAEE there was used pelargonic acid ethyl ester (referred to below as PAEE). The evaluation results are shown in Table 2.

TABLE 2

| | Polyfunctional Amine Solution | | Polyfunctional Acid Chloride Solution | | | | | | Desalting Rate | Water Flux | IPA Rejection |
| | | | | Carboxylic Acid or | | | | | | | |
| | m-PDA | Acylation Catalyst | TMC | Carboxylic Acid Ester | | | Acylation Catalyst | | | | |
| | wt % | type | wt % | wt % | type | wt % | total carbons | type | wt % | % | m³m⁻²d⁻¹ | Rate % |
|---|---|---|---|---|---|---|---|---|---|---|---|---|
| Example 11 | 1.0 | ϵ-CL | 1.5 | 0.06 | CAEE | 3 | 10 | BPMU | 0.15 | 99.5 | 1.40 | 91.7 |
| Example 12 | 1.5 | ϵ-CL | 1.5 | 0.08 | CAEE | 3 | 10 | BPMU | 0.15 | 99.6 | 1.37 | 93.2 |
| Example 13 | 1.5 | ϵ-CL | 1.5 | 0.10 | CAEE | 3 | 10 | DBF | 0.15 | 99.5 | 1.35 | 92.4 |
| Example 14 | 1.0 | ϵ-CL | 1.5 | 0.06 | CAEE | 3 | 10 | TEU | 0.15 | 99.5 | 1.55 | 88.2 |
| Example 15 | 1.5 | ϵ-CL | 1.5 | 0.06 | MAHE | 3 | 10 | — | — | 99.5 | 1.33 | 92.6 |
| Example 16 | 1.5 | ϵ-CL | 1.5 | 0.06 | PAME | 3 | 10 | — | — | 99.6 | 1.25 | 94.2 |
| Example 17 | 1.5 | ϵ-CL | 1.5 | 0.06 | PAEE | 3 | 11 | — | — | 99.5 | 1.14 | 93.9 |

Example 18

A composite semipermeable membrane was obtained in the same way as in Example 4 except that the CAEE was changed to 0.3 wt % of propionic acid (abbreviated below to PrA). The evaluation results are shown in Table 3.

Example 19

A composite semipermeable membrane was obtained in the same way as in Example 4 except that the CAEE was changed to 0.3 wt % of butyric acid (abbreviated below to BA). The evaluation results are shown in Table 3.

Example 20

A composite semipermeable membrane was obtained in the same way as in Example 4 except that the CAEE was changed to 0.3 wt % of isobutyric acid (abbreviated below to isoBA). The evaluation results are shown in Table 3.

Example 21

A composite semipermeable membrane was obtained in the same way as in Example 4 except that the CAEE was changed to 0.3 wt % of valeric acid (abbreviated below to PA). The evaluation results are shown in Table 3.

Example 22

A composite semipermeable membrane was obtained in the same way as in Example 4 except that the CAEE was changed to 0.3 wt % of isovaleric acid (abbreviated below to isoPA). The evaluation results are shown in Table 3.

Example 23

A composite semipermeable membrane was obtained in the same way as in Example 20 except that the catalyst in Example 20 was changed from NMP to ε-CL. The evaluation results are shown in Table 3.

Example 24

A composite semipermeable membrane was obtained in the same way as in Example 23 except that the concentration of the isobutyric acid in Example 23 was changed from 0.3 wt % to 0.03 wt %. The evaluation results are shown in Table 3.

Example 25

A composite semipermeable membrane was obtained in the same way as in Example 23 except that the concentration of isobutyric acid in Example 23 was changed from 0.3 wt % to 0.1 wt %. The evaluation results are shown in Table 3.

Example 26

A composite semipermeable membrane was obtained in the same way as in Example 23 except that the concentration of isobutyric acid in Example 23 was changed from 0.3 wt % to 0.6 wt %. The evaluation results are shown in Table 3.

Example 27

A composite semipermeable membrane was obtained in the same way as in Example 22 except that the catalyst in Example 22 was changed from NMP to ε-CL. The evaluation results are shown in Table 3.

Example 28

A composite semipermeable membrane was obtained in the same way as in Example 22 except that the catalyst in Example 22 was changed from NMP to ε-CL and 0.15% of DBF was also added to the polyfunctional acid chloride solution. The evaluation results are shown in Table 3.

Example 29

A composite semipermeable membrane was obtained in the same way as in Example 6 except that the catalyst in Example 6 was changed from NMP to ε-CL and the BPMU was changed to DBF. The evaluation results are shown in Table 3.

Example 30

A composite semipermeable membrane was obtained in the same way as in Example 29 except that as the polyfunctional amine kin Example 29 there was further added 1 wt % of 1,3,5-triaminobenzene (abbreviated below to TAB) and as the polyfunctional acid chloride there was further added 0.05 wt % of terephthaloyl chloride (abbreviated below to TPC). The evaluation results are shown in Table 3.

TABLE 3

| | Polyfunctional Amine Solution | | | Polyfunctional Acid Chloride Solution | | | | | Desalting Rate | Water Flux | IPA Rejection |
| | m-PDA | Acylation Catalyst | TMC | Carboxylic Acid or Carboxylic Acid Ester | | | Acylation Catalyst | | | | |
| | wt % | type | wt % | wt % | type | wt % | total carbons | type | wt % | % | $m^3 m^{-2} d^{-1}$ | Rate % |
|---|---|---|---|---|---|---|---|---|---|---|---|---|
| Example 18 | 1.5 | NMP | 1.5 | 0.06 | PrA | 0.3 | 3 | — | — | 99.6 | 1.14 | 91.7 |
| Example 19 | 1.5 | NMP | 1.5 | 0.06 | BA | 0.3 | 4 | — | — | 99.6 | 10.08 | 91.5 |
| Example 20 | 1.5 | NMP | 1.5 | 0.06 | isoBA | 0.3 | 4 | — | — | 99.6 | 1.07 | 91.0 |
| Example 21 | 1.5 | NMP | 1.5 | 0.06 | PA | 0.3 | 5 | — | — | 99.5 | 1.02 | 92.0 |
| Example 22 | 1.5 | NMP | 1.5 | 0.06 | isoPA | 0.3 | 5 | — | — | 99.6 | 1.33 | 90.0 |
| Example 23 | 1.5 | ε-CL | 1.5 | 0.06 | isoBA | 0.3 | 4 | — | — | 99.5 | 1.08 | 91.6 |
| Example 24 | 1.5 | ε-CL | 1.5 | 0.06 | isoBA | 0.03 | 4 | — | — | 99.5 | 1.20 | 90.2 |
| Example 25 | 1.5 | ε-CL | 1.5 | 0.06 | isoBA | 0.1 | 4 | — | — | 99.5 | 1.15 | 91.1 |
| Example 26 | 1.5 | ε-CL | 1.5 | 0.06 | isoBA | 0.6 | 4 | — | — | 99.8 | 1.06 | 91.5 |
| Example 27 | 1.5 | ε-CL | 1.5 | 0.06 | isoPA | 0.3 | 5 | — | — | 99.3 | 1.20 | 91.5 |
| Example 28 | 1.5 | ε-CL | 1.5 | 0.06 | isoPA | 3 | 5 | DBF | 0.15 | 99.6 | 1.39 | 90.0 |
| Example 29 | 1.5 | ε-CL | 1.5 | 0.06 | CAEE | 3 | 10 | DBF | 0.15 | 99.6 | 1.36 | 94.2 |
| Example 30 | 1.5 TAB 1.0 | ε-CL | 1.5 | 0.06 TPC 0.05 | CAEE | 3 | 10 | DBF | 0.15 | 99.6 | 0.92 | 95.0 |

Comparative Example 1

A composite semipermeable membrane was obtained in the same way as in Example 1 except that no CAEE was added. The evaluation results are shown in Table 4.

Comparative Example 2

A composite semipermeable membrane was obtained in the same way as in Example 4 except that no CAEE was added. The evaluation results are shown in Table 4.

Comparative Example 3

A composite semipermeable membrane was obtained in the same way as in Example 7 except that instead of the CAEE there was used propionic acid isobutyl ester (abbreviated below to PrAlBuE). The evaluation results are shown in Table 4.

Comparative Example 4

A composite semipermeable membrane was obtained in the same way as in Example 7 except that instead of the CAEE there was used 2-butanone (referred to below 2-BuCO). The evaluation results are shown in Table 4.

Comparative Example 5

A composite semipermeable membrane was obtained in the same way as in Example 30 except that no ε-caprolactam, caprylic acid ethyl ester or dibutylformamide were added. The evaluation results are shown in Table 4.

TABLE 4

| | Polyfunctional Amine Solution | | Polyfunctional Acid Chloride Solution | | | | | | Desalting Rate | Water Flux | IPA Rejection |
|---|---|---|---|---|---|---|---|---|---|---|---|
| | | | | Carboxylic Acid or | | | | | | | |
| | m-PDA | Acylation Catalyst | TMC | Carboxylic Acid Ester | | | Acylation Catalyst | | Rate | Water Flux | Rejection |
| | wt % | type | wt % | wt % | type | wt % | total carbons | type | wt % | % | $m^3 m^{-2} d^{-1}$ | Rate % |
| Comp. Ex. 1 | 1.5 | — | — | 0.06 | — | — | — | — | — | 99.6 | 0.73 | 93.4 |
| Comp. Ex. 2 | 1.5 | NMP | 1.5 | 0.06 | — | — | — | — | — | 99.6 | 0.87 | 92.6 |
| Comp. Ex. 3 | 1.5 | ε-CL | 1.5 | 0.06 | PrAlBuE* | 3 | 7 | — | — | 99.6 | 0.87 | 95.8 |
| Comp. Ex. 4 | 1.5 | ε-CL | 1.5 | 0.06 | 2-BuCO** | 3 | 4 | — | — | 99.6 | 0.85 | 95.0 |
| Comp. Ex. 5 | 1.5 TAB 1.0 | ε-CL | 1.5 | 0.06 TPC 0.05 | — | — | — | — | — | 99.6 | 0.50 | 92.8 |

*number of carbons = 7
**ketone

As shown in Tables 1 to 4, in the systems where a carboxylic acid ester having at least 8 carbons is added, the water flux, which is an index of permeability, is raised compared to systems where no addition was made. Furthermore, by a combination of carboxylic acid ester and acylation catalyst, the water flux is further raised.

Industrial Application Potential

In accordance with the present invention, it is possible to produce a composite semipermeable membrane of high water permeability where operation is possible at lower pressures. This can be employed in wide-ranging fields such as in the desalination of brackish water and in the production of ultra-pure water for semiconductor washing, and it is possible to achieve savings in energy, cost reductions and savings in space.

What is claimed is:

1. A method of producing a composite semipermeable membrane comprising forming a separating functional layer comprising crosslinked polyamide in the presence of 1) a carboxylic acid ester with a total of 8 or more carbons, or 2) a carboxylic acid.

2. The method of claim 1 wherein the separating functional layer comprising crosslinked polyamide is formed in the presence additionally of an acylation catalyst.

3. The method of claim 2 wherein wherein said forming is in the presence of two or more types of acylation catalysts.

4. The method of claim 2 wherein, when forming the separating functional layer comprising crosslinked polyamide by means of interfacial polycondensation by bringing into contact, on a porous substrate, an aqueous solution comprising polyfunctional amine and a solution of polyfunctional acid chloride in an organic solvent which is immiscible with water, the acylation catalyst is included in the aforesaid aqueous solution.

5. The method of claim 1 wherein the carboxylic acid ester with a total of 8 or more carbons is an aliphatic carboxylic acid ester with a total of 8 to 20 carbons.

6. The method of claim 1 wherein the carboxylic acid is a carboxylic acid of boiling point no more than 240° C.

7. The method of claim 2 wherein the acylation catalyst is at least one type of compound selected from the group consisting of:
   (1) N-alkylamides or N,N-dialkylamides having an alkyl group with 3 or more carbons as a substituent group on the nitrogen atom;
   (2) Cyclic alkylamides or N-alkyl cyclic alkylamides having a cyclic structure with 5 or more carbons;
   (3) N,N,N',N'-tetraalkylureas having alkyl groups as substituent groups on the nitrogen atoms; and
   (4) Alkylene ureas with a cyclic structure which includes an alkylene chain with 3 or more carbons.

8. The method of claim 1 wherein the crosslinked polyamide is a crosslinked aromatic polyamide.

9. A composite semipermeable membrane produced by the method according to claim 1.

10. An element comprising a composite semipermeable membrane according to claim 9.

11. A plant comprising an element according to claim 10.

12. An equipment comprising an element according to claim 10.

13. A method for water treatment comprising supplying a source water to an equipment and collecting a permeated water, wherein the equipment comprises an element comprising a composite semipermeable membrane comprising crosslinked polyamide formed in the presence of 1) a carboxylic acid ester with a total of 8 or more carbons, or 2) a carboxylic acid.

14. The method according to claim 13 wherein said operating is done at an operating pressure in the range of 0.1 MPa to 3.0 MPa.

15. A method of producing a composite semipermeable membrane comprising forming a separating functional layer comprising crosslinked polyamide by interfacial polycondensation in the presence of 1) a carboxylic acid ester with a total of 8 or more carbons, or 2) a carboxylic acid.

* * * * *